(No Model.)

W. JOSLIN.
CAR WHEEL.

No. 405,710. Patented June 25, 1889.

Witnesses:
Jesse H. MacMath,
Frank E. Munger.

William Joslin Inventor:

UNITED STATES PATENT OFFICE.

WILLIAM JOSLIN, OF CLEVELAND, OHIO.

CAR-WHEEL.

SPECIFICATION forming part of Letters Patent No. 405,710, dated June 25, 1889.

Application filed September 7, 1888. Serial No. 284,844. (No model.)

*To all whom it may concern:*

Be it known that I, WILLIAM JOSLIN, a citizen of the United States, residing at Cleveland, in the county of Cuyahoga and State of Ohio, have invented new and useful Improvements in Car-Wheels for Railroads, of which the following is a specification.

Figure 1:
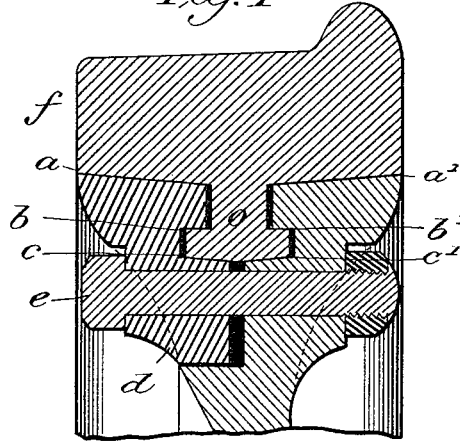
Figure 4:
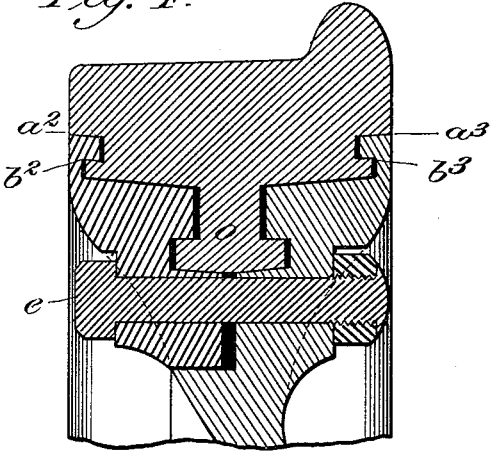
Figure 2:
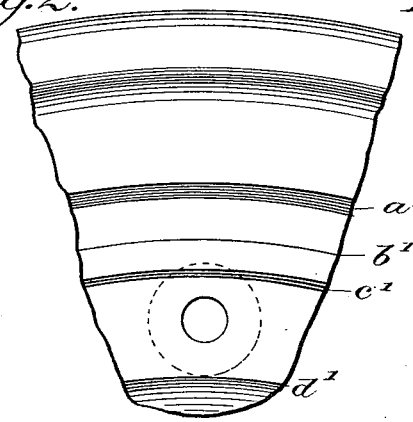
Figure 5:
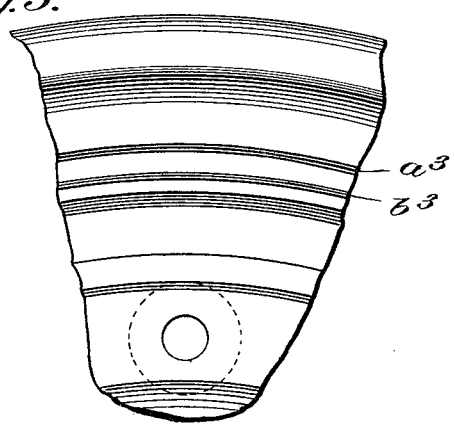
Figure 3:
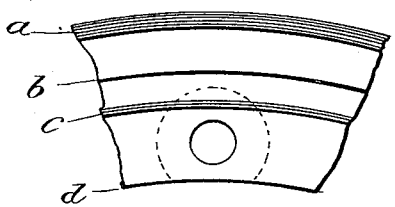
Figure 6:
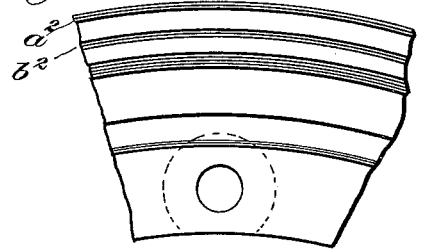

Figure 1 is a cross-section of the outer portion of a wheel embodying my invention; Fig. 2, a detail side view of a portion of the wheel, one half of the central portion being removed; Fig. 3, a detail side view of a portion of the locking-ring or second half of the central portion of the wheel; Fig. 4, a cross-section of a modified form of wheel; Fig. 5, a view similar to Fig. 2 of the modification shown in Fig. 4; Fig. 6, a view similar to Fig. 3 of the modification, Fig. 4.

My invention relates to improvements in car-wheels for railroads with steel tire or other metal, and a center of one or more pieces made of steel, iron, or other metal.

The novelty of my invention consists in constructing the wheel with double angular or inclined surfaces or bearings outward from an internal or center projecting flange of the tire, with a retaining-ring or longitudinal projection from each side of the internal flange of the tire, and the center or body of the wheel so constructed as to fit the outward inclined angles of the tire and interlocking the retaining-rings or longitudinal projections on each side of the internal or center projecting flange of the tire.

Fig. 1 is a longitudinal section through the center of the wheel, showing a portion of the tire and a portion of the wheel-body and counterpart ring or plate which joins or fits the opposite side of the tire and internal flange of the tire, the same as the main body of the wheel joins the other side of the tire it is attached to. Fig. 3 is a portion of the ring or plate, showing its construction, which is the same as the body of the wheel that fits or comes in contact with the tire.

The letters of Figs. 1, 2, and 3 indicate the construction of the three parts of the wheel. Fig. 1 gives a clear conception of the manner in which the three parts of the wheel are joined together as a compact whole. The letters $a'\ b'\ c'$ in Fig. 1 and $a'\ b'\ c'$ in Fig. 2 show the angular or beveled joints of the tire and body of the wheel. The letters $a\ b\ c$ in Fig. 1 and $a\ b\ c$ in Fig. 3 show corresponding angular joints on the opposite side of the wheel. The angles or bearings of the joining parts of the wheel are all of the same angle or bevel—about three (3°) degrees, more or less—and are constructed identically the same in the angles and in the diameters, and may be finished with the same machine. Then by reversing the face of the ring or plate, Fig. 3, it joins perfectly the opposite internal angular surfaces or bearings of the tire.

The inner center projecting flange $o$ of the tire is grooved on each side, with angles corresponding to the angular joints $a$ and $a'$, Fig. 1, thereby leaving a retaining-ring or longitudinal projection on each side of the internal flange of the tire, as shown by the letters $b\ c$ and $b'\ c'$, Fig. 1. The inner portion of $c$ and $c'$ of the internal flange $o$ of the tire is finished with the same angle as the surfaces or joints $a$ and $a'$, so that the angles $c$ and $c'$ meet in the center of the internal flange $o$ of the tire.

The outer peripheries $a\ a'$ and $c\ c'$ of the wheel-body are finished with angles corresponding to the angles of the inner peripheries of the tire and internal flange $o$ of the tire. The inner portions of the wheel-body are grooved, as shown at $b\ c$ and $b'\ c'$, to receive the retaining-ring on each side of the internal flange $o$ of the tire, with like angles, thus forming a full and complete center or wheel-body with the tire. The surfaces or bearings of the wheel-body $a\ c$ and $a'\ c'$ which come in contact with the inner peripheries of the tire at $a\ c$ and $a'\ c'$ are made correspondingly greater in diameter on the plane of their respective diameters than the inner bearings or peripheries of the tire, thereby producing radial vacancies or spaces between and around the entire body and tire of the wheel, as shown by the heavy or wide lines on each side of the flange $o$ of the tire and the body and ring or plate of the wheel, also between the ring and body of the wheel. The space between the ring and body of the wheel is equal in width to the spaces on each side of the flange $o$ of the tire and both parts of the wheel-body. By this construction the tire and opposite parts of the wheel-body are drawn firmly together by means of bolts shown at $e$, Fig. 1, and any looseness occurring by use or wear can be remedied by means of said bolts.

$d$ in Fig. 1 shows the ring or plate of the wheel-body joined to the body by a circular projecting shoulder or flange on the wheel-body, over which the inner periphery of the ring or plate is fitted, as shown at $d$, Fig. 1, which produces firmness between the parts of the wheel.

It will be readily seen that the two joints or bearings $a$ and $a'$ and the two joints or bearings $c$ and $c'$ combined are greater in width than the entire width of the tire, thus giving very large wearing-surfaces between the tire and wheel-body, also greater durability.

It may be advisable in some cases to place or construct the internal flange $o$ of the tire somewhat out of center toward the outer face $a$ of the wheel, Fig. 1, thereby giving more surface or bearing to the main body of the wheel. In such an event it would not affect the amount of relative surfaces between the tire and the two parts of the wheel-body. What is taken from one part is added to the other; hence the surface or bearing parts of the wheel remain the same; also the internal flange $o$ of the tire may be constructed to project farther inwardly, thereby giving width sufficient for the bolts to pass through the flange $o$ of the tire.

Other advantageous features or improvements of the wheel are apparent. The double angular or inclined surfaces or bearings of the wheel gives a greater thickness to the tire in the center, where the greatest labor comes. The double incline of the bearings $a\,a'$ and $c\,c'$ has a tendency to draw and hold the tire together as the bolts are drawn up in a measure proportional to the degrees of the opposing angles. The bolts have an important feature in their application. The entire power of the bolts is spent in compressing the parts of the wheel together without affecting the internal flange of the tire. No power of the bolts is lost or spent by drawing upon the internal flange of the tire, as in my patent, No. 311,837, February 3, 1885. The bearings $a$ and $a'$, Fig. 1, extend to the entire edge of each side or face of the tire, thereby giving great support to the outer portions of the tire combined with the double angles of the tire and body of the wheel.

In some cases the internal flange $o$ of the tire may be widened inward and drilled to allow the bolts to pass through the internal flange of the tire.

It will be readily seen from the construction of the double central retaining-rings on each side of the inner center projecting flange $o$ of the tire that in case of the tire becoming fractured it is impossible for any part of the tire to become disengaged from the body of the wheel. As an auxiliary to the main central retaining-rings, a second set of retaining-rings may be constructed on the outer sides or faces of the tire and wheel-body, as shown by the letters $a^2\,b^2$ and $a^3\,b^3$ in Fig. 4. The construction of Fig. 4 is the same or identical with the construction of Fig. 1, except the outer retaining-rings, as above mentioned. With these double sets of retaining-rings, as shown in Fig. 4, a double security is obtained in the event of fracture of the tire.

After thus describing my invention, I do not claim constructing car-wheels with angular bearing-surface with vacancy to take up looseness of the wheel parts by means of bolts. Nor do I claim retaining-rings as such, as they have been in use before my invention; but What I do claim, and desire to secure by Letters Patent, is—

1. A wheel having a tire and center parts or body with double opposing angular surfaces or bearings projecting outward from an approximately central internal flange of the tire secured by means of bolts, the opposing angular surfaces or bearing parts of the wheel-body being constructed with greater diameters in the plane of the surfaces or bearings on both sides of the central inner projecting flange of the tire, said difference of said diameters normally creating open spaces between said parts of said wheel-body and both sides of said inner projecting flange $o$ of said tire, the joining faces $a\,a'$ and $c\,c'$ of said tire and wheel-body being counterpart inclines to each other, said parts being adapted to permit the drawing of said parts of the wheel-body together by said bolts in wedge movement toward said internal flange of said tire, by which operation the tire and wheel-body are drawn firmly together and any looseness of the wheel is remedied, substantially as set forth.

2. The combination, with the tire having an inner projecting flange, the tire and flange having corresponding oppositely-inclined bearing-faces, of the central portion composed of two parts, each having two sets of bearing-faces which correspond with and fit against the bearing-faces on one-half of the tire, and having spaces between the opposing sides of the said parts and the sides of the said flange, and the bolts for drawing the said parts together, substantially as set forth.

3. The combination, with the tire having grooves in its sides, and having an inner projecting flange, the tire and the flange having oppositely-inclined bearing-faces, of the central portion composed of two parts, each having bearing-faces to correspond with and fit against the bearing-faces on half of the tire, and having a flange to fit in the groove in the side of the tire, spaces being left between the opposing sides of the said parts, flange, and tire, substantially as shown, and the bolts for securing the parts together, substantially as described.

WILLIAM JOSLIN.

Witnesses:
JESSE H. MACMATH,
W. B. NEFF.